US012131258B2

(12) United States Patent
Lu et al.

(10) Patent No.: US 12,131,258 B2
(45) Date of Patent: Oct. 29, 2024

(54) JOINT PRUNING AND QUANTIZATION SCHEME FOR DEEP NEURAL NETWORKS

(71) Applicant: QUALCOMM Incorporated, San Diego, CA (US)

(72) Inventors: Yadong Lu, Irvine, CA (US); Ying Wang, San Diego, CA (US); Tijmen Pieter Frederik Blankevoort, Amsterdam (NL); Christos Louizos, Amsterdam (NL); Matthias Reisser, Weesp (NL); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 970 days.

(21) Appl. No.: 17/030,315

(22) Filed: Sep. 23, 2020

(65) Prior Publication Data

US 2021/0089922 A1 Mar. 25, 2021

(30) Foreign Application Priority Data

Sep. 24, 2019 (GR) ............................. 20190100410

(51) Int. Cl.

*G06N 3/082* (2023.01)
*G06N 3/04* (2023.01)
*G06N 3/063* (2023.01)

(52) U.S. Cl.

CPC ............... *G06N 3/082* (2013.01); *G06N 3/04* (2013.01); *G06N 3/063* (2013.01)

(58) Field of Classification Search

CPC ............ G06N 3/082; G06N 3/08; G06N 3/04; G06N 3/02; G06N 3/063; G06N 3/06

USPC ...................................................... 706/25, 15

See application file for complete search history.

(56) References Cited

U.S. PATENT DOCUMENTS

| | | | | |
|---|---|---|---|---|
| 11,748,615 | B1 * | 9/2023 | Wu | G06N 3/08 706/25 |
| 2017/0293659 | A1 * | 10/2017 | Huang | H03M 7/3066 |
| 2019/0286989 | A1 | 9/2019 | Wang et al. | |
| 2019/0340534 | A1 * | 11/2019 | McMahan | G06F 17/18 |
| 2019/0347554 | A1 * | 11/2019 | Choi | G06N 3/04 |
| 2020/0097818 | A1 * | 3/2020 | Li | G06N 3/08 |
| 2020/0134461 | A1 * | 4/2020 | Chai | G06N 3/084 |

(Continued)

FOREIGN PATENT DOCUMENTS

CN 109523016 A 3/2019

OTHER PUBLICATIONS

Liu et al., "Learning Efficient Convolutional Networks through Network Slimming", 2017 IEEE International Conference on Computer Vision (ICCV), Oct. 2017, pp. 2755-2763. (Year: 2017).*

(Continued)

*Primary Examiner* — Hwei-Min Lu
(74) *Attorney, Agent, or Firm* — Seyfarth Shaw LLP

(57) ABSTRACT

A method for compressing a deep neural network includes determining a pruning ratio for a channel and a mixed-precision quantization bit-width based on an operational budget of a device implementing the deep neural network. The method further includes quantizing a weight parameter of the deep neural network and/or an activation parameter of the deep neural network based on the quantization bit-width. The method also includes pruning the channel of the deep neural network based on the pruning ratio.

26 Claims, 7 Drawing Sheets

600

DETERMINE A PRUNING RATIO FOR A CHANNEL AND A QUANTIZATION BIT-WIDTH BASED ON AN OPERATIONAL BUDGET OF A DEVICE IMPLEMENTING THE DEEP NEURAL NETWORK — 602

QUANTIZE A WEIGHT PARAMETER OF THE DEEP NEURAL NETWORK AND/OR AN ACTIVATION PARAMETER OF THE DEEP NEURAL NETWORK BASED ON THE QUANTIZATION BIT-WIDTH — 604

PRUNE THE CHANNEL OF THE DEEP NEURAL NETWORK BASED ON THE PRUNING RATIO — 606

(56) References Cited

U.S. PATENT DOCUMENTS

2020/0302269 A1* 9/2020 Ovtcharov ............ G06N 3/044
2020/0380371 A1* 12/2020 Ding ...................... G06N 3/048

OTHER PUBLICATIONS

Louizos et al., "Learning Sparse Neural Networks Through Lo Regularization", ICLR 2018 Conference, Jun. 22, 2018, pp. 1-13. (Year: 2018).*
Xu et al., "DNQ: Dynamic Network Quantization", ARXIV, Dec. 6, 2018, pp. 1-10. (Year: 2018).*
Zhao et al., "Variational Convolutional Neural Network Pruning", 2019 IEEE/CVF Conference on Computer Vision and Pattern Recognition (CVPR), Jun. 2019, pp. 2775-2784. (Year: 2019).*
Wielgosz et al., "Mapping Neural Networks to FPGA-Based IoT Devices for Ultra-Low Latency Processing", Sensors 2019, 19, 2981, Jul. 5, 2019. (Year: 2019).*
Polino et al., "Model compression via distillation and quantization", arXiv Article: 1802.05668, Feb. 15, 2018. (Year: 2018).*
Agustsson et al., "Soft-to-Hard Vector Quantization for End-to-End Learning Compressible Representations", arXiv Article: 1704. 00648v2, Jun. 8, 2017. (Year: 2017).*
Ge et al., "Compressing deep neural networks for efficient visual inference", Proceedings of the IEEE International Conference on Multimedia and Expo (ICME), Jul. 2017, pp. 667-672. (Year: 2017).*
Yang et al., "Designing Energy-Efficient Convolutional Neural Networks using Energy-Aware Pruning", 2017 IEEE Conference on Computer Vision and Pattern Recognition (CVPR), Jul. 2017, pp. 6071-6079. (Year: 2017).*
Liu et al., "Learning Efficient Convolutional Networks through Network Slimming", 2017 IEEE International Conference on Computer Vision (ICCV), Oct. 2017, (Year: 2017).*
Maness et al., "Automated Pruning for Deep Neural Network Compression", arXiv Article: 1712.01721, Dec. 5, 2017. (Year: 2017).*
He et al., "AMC: AutoML for Model Compression and Acceleration on Mobile Devices", Proceedings of the European conference on computer vision (ECCV), Feb. 2018, pp. 1-17. (Year: 2018).*
Polino et al., "Model compression via distillation and quantization", arXiv Article: 1802.05668, Feb. 15, 2018. (Yea: 2018) (Year: 2018).*
Tung et al., "CLIP-Q: Deep Network Compression Learning by In-parallel Pruning-Quantization", 2018 IEEE/CVF Conference on Computer Vision and Pattern Recognition, Jun. 2018, pp. 7873-7882. (Year: 2018).*
Liu et al., "On-demand deep model compression for mobile devices: A usage-driven model selection framework", Proceedings of the 16th Annual International Conference on Mobile Systems, Applications, and Services, Jun. 2018, pp. 389-400. (Year: 2018).*
Louizos et al., "Learning Sparse Neural Networks Through L0 Regularization", ICLR 2018 Conference, Jun. 22, 2018, pp. 1-13. (Year: 2018).*
Louizos et al., "Relaxed Quantization for Discretized Neural Networks", arXiv Article: 1810.01875, Oct. 3, 2018. (Year: 2018).*
Cheng et al., "Differentiable Fine-grained Quantization for Deep Neural Network Compression", arXiv Article: 1810.10351v3, Nov. 13, 2018. (Year: 2018).*
Wu et al., "Mixed Precision Quantization of ConvNets via Differentiable Neural Architecture Search", arXiv Article: 1812.00090, Nov. 30, 2018. (Year: 2018).*
Xu et al., "DNQ: Dynamic Network Quantization", arXiv Article: 1812.02375, Dec. 6, 2018, pp. 1-10. (Year: 2018).*
Wang et al., "HAQ: Hardware-Aware Automated Quantization with Mixed Precision", 2019 IEEE/CVF Conference on Computer Vision and Pattern Recognition (CVPR), Jun. 2019, pp. 8604-8612. (Year: 2019).*
Ding et al., "FLightNNs: Lightweight Quantized Deep Neural Networks for Fast and Accurate Inference", 2019 56th ACM/IEEE Design Automation Conference (DAC), Jun. 2019, pp. 1-6. (Year: 2019).*
Zhao et al., "Variational Convolutional Neural Network Pruning", 2019 IEEE/CVF Conference on Computer Vision and Pattern Recognition (CVPR), Jun. 2019, pp. 2775-2784. (Year: 2019) (Year: 2019).*
Jung et al., "Learning to Quantize Deep Networks by Optimizing Quantization Intervals With Task Loss", 2019 IEEE/CVF Conference on Computer Vision and Pattern Recognition (CVPR), Jun. 2019, pp. 4345-4354. (Year: 2019).*
Zhou et al., "Edge Intelligence: Paving the Last Mile of Artificial Intelligence With Edge Computing", Proceedings of the IEEE, vol. 107, No. 8, Jun. 12, 2019, pp. 1738-1762. (Year: 2019).*
Wielgosz et al., "Mapping Neural Networks to FPGA-Based loT Devices for Ultra-Low Latency Processing", Sensors 2019, 19, 2981, Jul. 5, 2019. (Year: 2019).*
Ramakrishnan et al., "Differentiable Mask Pruning for Neural Networks", arXiv Article: 1909.04567, Sep. 10, 2019. (Year: 2019).*
Han S., et al., "Deep Compression: Compressing Deep Neural Networks with Pruning, Trained Quantization and Huffman Coding", arxiv. org, Feb. 1, 2016 (Feb. 1, 2016), 14 pages, XP055534891, abstract; figures 1-3 p. 2, line 27-p. 5, line 19.
He Y., et al., "AMC: AutoML for Model Compression and Acceleration on Mobile Devices," arxiv.org, Cornell University Library, 201 Olin Library Cornell University Ithaca, NY 14853, Feb. 10, 2018 (Feb. 10, 2018), XP081259295, 17 pages, abstract; figure 1 p. 3, line 1-line 9 p. 5, line 7-p. 7, line 23.
International Search Report and Written Opinion—PCT/US2020/052544—ISA/EPO—Feb. 9, 2021.
Kuan W., et al., "HAQ: Hardware-Aware Automated Quantization With Mixed Precision," 2019 IEEE/CVF Conference on Computer Vision and Pattern Recognition (CVPR), IEEE, Jun. 15, 2019 (Jun. 15, 2019), pp. 8604-8612, XP033687500, DOI: 10.1109/CVPR. 2019.00881 [retrieved on Jan. 8, 2020] abstract; figures 1, 2 p. 8604 , col. 1. line 1-p. 8605, col. 2, line 42 p. 8606, col. 2, line 13-p. 8611, col. 1, line 8.

* cited by examiner

JOINT PRUNING AND QUANTIZATION SCHEME FOR DEEP NEURAL NETWORKS

CROSS-REFERENCE TO RELATED APPLICATION

The present application claims priority to Greece Patent Application No. 20190100410, filed on Sep. 24, 2019, and titled "LEARNING AN OPTIMAL BIT WIDTH FOR QUANTIZATION AND PRUNING OF DEEP NEURAL NETWORKS," the disclosure of which is expressly incorporated by reference in its entirety.

BACKGROUND

Field

Aspects of the present disclosure generally relate to deep neural networks and, more particularly, to jointly learning and applying a pruning and quantization scheme for model compression.

Background

Edge devices, such as a mobile device, may be limited in storage, memory, and processing power. There is an emerging need to implement deep neural networks on edge devices. For example, deep neural networks may improve privacy or implement Internet of Things (IoT) services. To implement deep neural networks on edge devices, it is desirable to reduce a size of deep neural networks, while preserving performance.

SUMMARY

According to an aspect of the present disclosure, a method performed by a deep neural network determines a pruning ratio for a channel and a quantization bit-width based on an operational budget of a device implementing the deep neural network. The method quantizes a weight parameter of the deep neural network and/or an activation parameter of the deep neural network based on the quantization bit-width. The method further prunes the channel of the deep neural network based on the pruning ratio.

In another aspect of the present disclosure, an apparatus for wireless communications performed by a deep neural network, includes a processor and memory coupled with the processor. Instructions stored in the memory are operable, when executed by the processor, to cause the apparatus to determine a pruning ratio for a channel and a quantization bit-width based on an operational budget of a device implementing the deep neural network. The apparatus can also quantize a weight parameter of the deep neural network and/or an activation parameter of the deep neural network based on the quantization bit-width. The apparatus can further prune the channel of the deep neural network based on the pruning ratio.

In another aspect of the present disclosure, a deep neural network includes means for determining a pruning ratio for a channel and a quantization bit-width based on an operational budget of a device implementing the deep neural network. The deep neural network includes means for quantizing a weight parameter of the deep neural network and/or an activation parameter of the deep neural network based on the quantization bit-width. The deep neural network further includes means for pruning the channel of the deep neural network based on the pruning ratio.

In another aspect of the present disclosure, a non-transitory computer-readable medium with program code recorded thereon is disclosed. The program code is executed by a deep neural network and includes program code to determine a pruning ratio for a channel and a quantization bit-width based on an operational budget of a device implementing the deep neural network. The deep neural network includes program code to quantize a weight parameter of the deep neural network and/or an activation parameter of the deep neural network based on the quantization bit-width. The deep neural network further includes program code to prune the channel of the deep neural network based on the pruning ratio.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
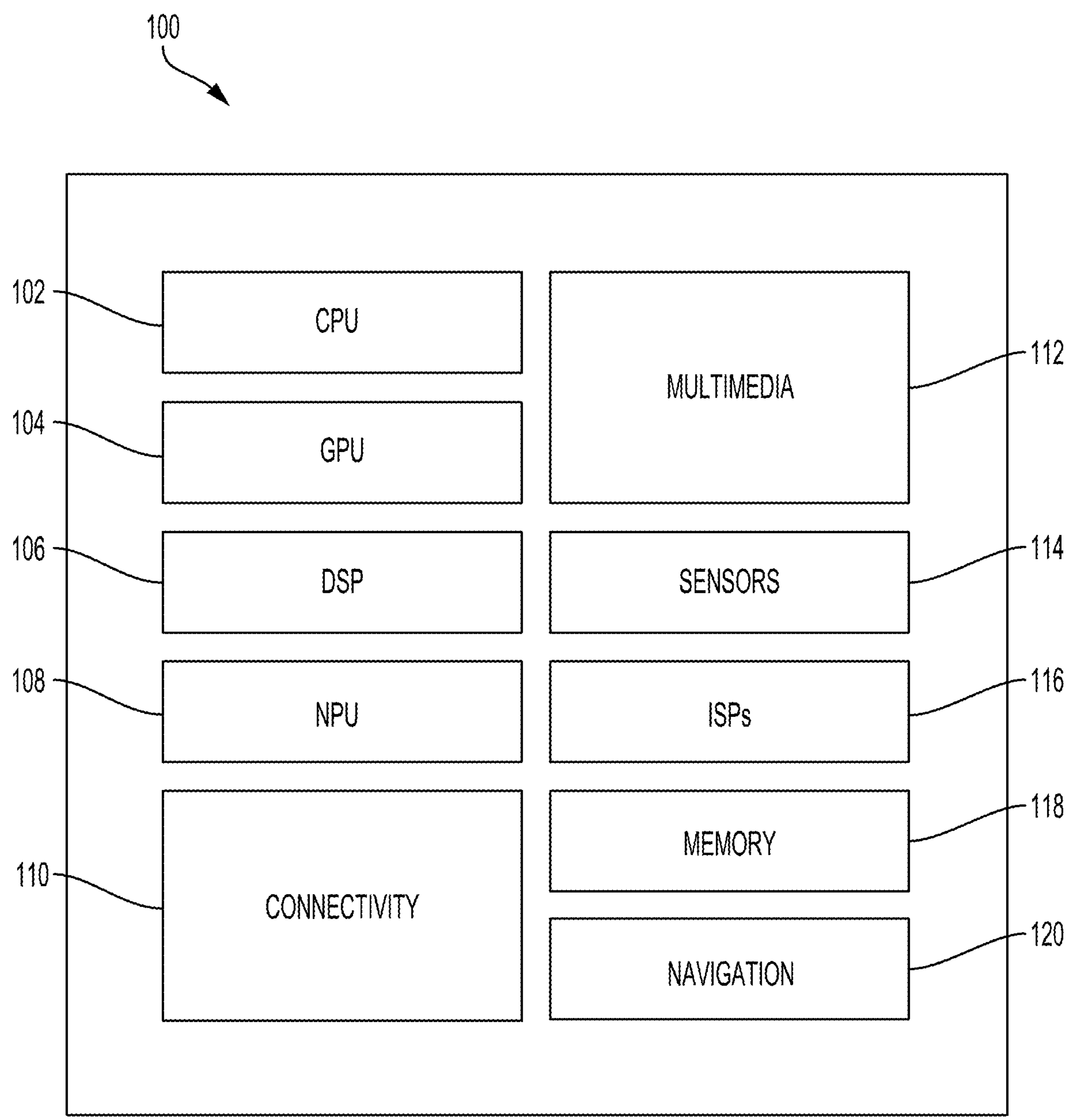
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts are described. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Emerging technological needs, such as privacy and Internet of things (IoT) services, implement deep neural networks on edge devices, such as mobile devices. Edge devices may have limited storage, memory, and/or processing capabilities. Model compression reduces a model size and reduces computational use.

Conventional systems prune or quantize deep neural networks to obtain compressed models. Additionally, some conventional systems perform a two-stage compression process that includes pruning and quantizing. These conventional systems may not achieve a balance between sparsity and precision because the pruning and quantizing may be applied independently. Therefore, the two-stage compression scheme may be inefficient because it does not consider the trade-off between sparsity and quantization resolution. For example, if a model is pruned significantly, a quantization bit-width may be large due to reduced redundancy. Further, increasing an amount of pruning may increase a model's sensitivity to input or quantization noise. Different layers have different sensitivities to pruning and quantization, therefore, it may be challenging for conventional systems to optimize a model via a holistic approach.

Additionally, conventional quantization methods use a fixed bit-width for all layers of a neural network. However, hardware platforms may support a mixed-precision bit-width. Therefore, a joint optimization scheme may support learning the bit-width. Some conventional systems are limited to implementing power-of-two bit-widths. That is, other bit-widths may be rounded up to the nearest power-of-two values, resulting in inefficiencies in computation and storage.

Aspects of the present disclosure are directed to a joint pruning and quantization scheme to improve model compression. In one configuration, a variational information bottleneck approach for structured pruning is combined with a mixed-precision bit-width quantization to generate a single differentiable loss function. Mixed-precision bit-width quantization refers to quantizing a deep neural network with a different bit-width (e.g., mixed-precision bit-width) specified for two or more layers of the deep neural network. In this configuration, the model training, or fine-tuning, may be performed once for end-to-end model compression. More specifically, according to aspects of the present disclosure, both a pruning ratio and quantization bits are optimized during training. In a first scheme, a novel quantizer with a learnable mask is designed to control the bit-width for each layer of the neural network. In a second scheme, level zero (L0) pruning is combined with a differentiable quantizer. The combination allows for end-to-end training with a memory constraint or a bit-operations (BOPs) constraint.

The learning rate schedule for parameters in a differentiable quantizer may be fine-tuned. The annealing schedule for regularization strength may also be fine-tuned. The fine-tuning increases the stability in model training.

FIG. 1 illustrates an example implementation of a system-on-a-chip (SOC) 100, which may include a central processing unit (CPU) 102 or a multi-core CPU configured for joint pruning and quantization, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, WI-FI™ connectivity, USB connectivity, BLUETOOTH™ connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code for: determining a pruning ratio for a channel and a mixed-precision quantization based on the memory budget or the computation budget; quantizing at least one of a weight parameter of the deep neural network, an activation parameter of the deep neural network, or a combination thereof based on the mixed-precision quantization; and pruning the channel of the deep neural network based on the pruning ratio.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training.

Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
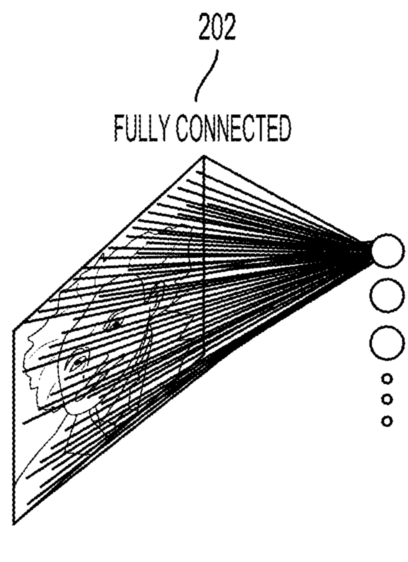
FIGS. 2A, 2B, and 2C are diagrams illustrating a neural network in accordance with aspects of the present disclosure.
Figure 2B:
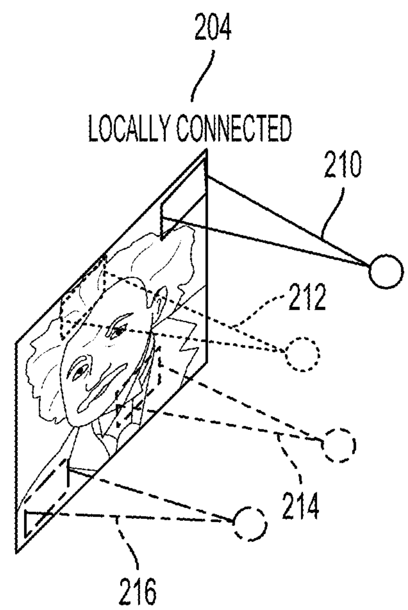

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
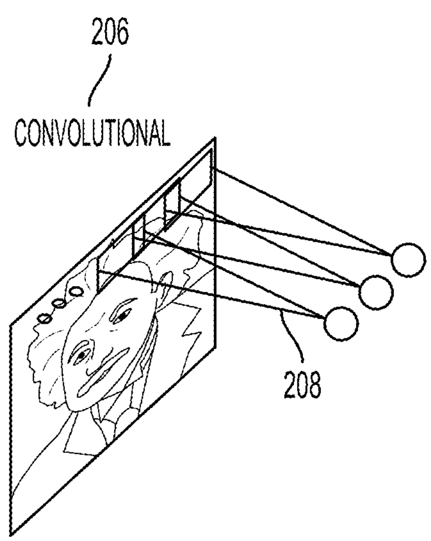

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
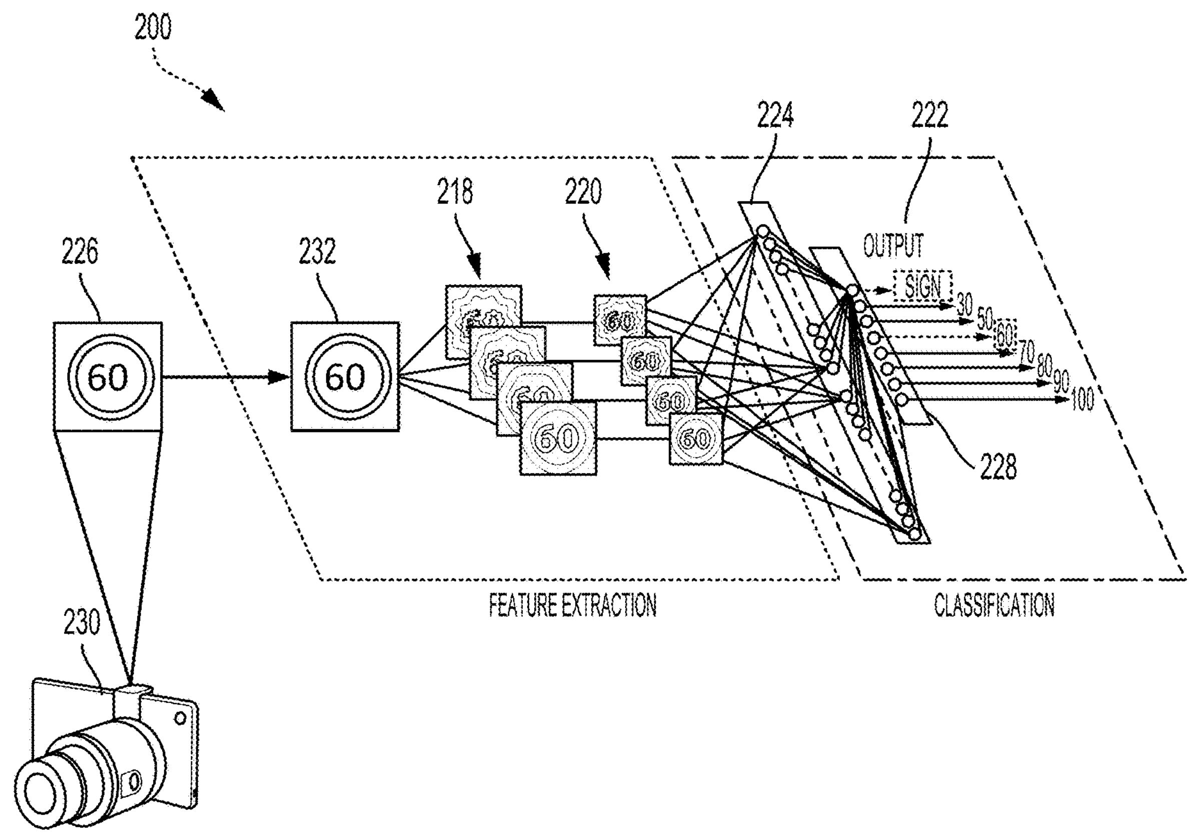
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
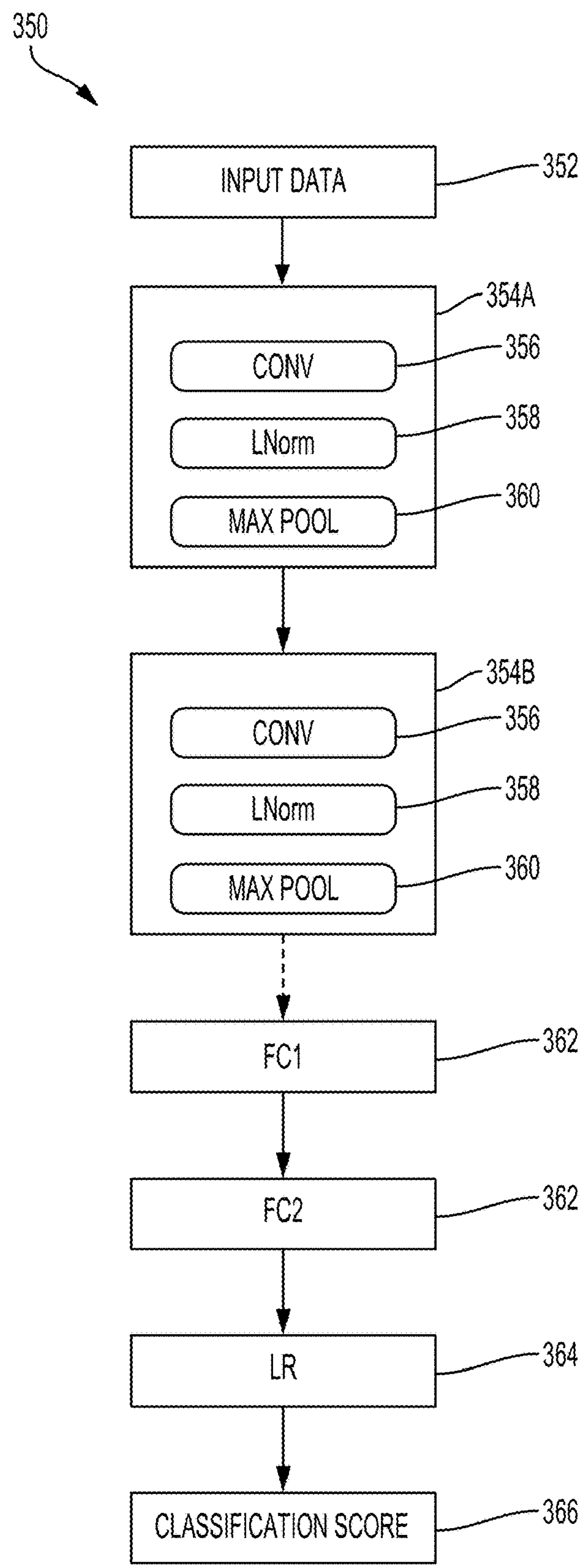
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data, including a feature from a set of features.

As described, some conventional systems separately quantize and compress a neural network. Additionally, some conventional systems independently perform both quantization and compression. Aspects of the present disclosure are directed to joint optimization of mixed-precision bit-width quantization and structured pruning. For ease of explanation mixed-precision bit-width quantization may also be referred to as mixed-precision quantization.

Quantization approaches may be summarized into two categories: fixed-bit and mixed-precision quantization. As described above, fixed-bit quantization sets a same bit-width for all layers. Additionally, mixed-precision quantization sets a different bit-width for two or more layers. In some examples, a second-order quantization method may select quantization bits based on a largest eigenvalue of the Hessian of each layer and the trace, respectively. In other examples, reinforcement-based schemes may learn the bit-width. Aspects of the present disclosure propose a differentiable quantization (DQ) scheme for learning the bit-width of both weights and activations. The bit-width may be estimated by defining a continuous relaxation and using a straight-through estimator for the gradients.

Structured pruning approaches may be summarized into two categories: a fixed pruning ratio and a learned pruning ratio for each layer. In some systems, an iterative two-step channel pruning scheme is used for a fixed pruning ratio. The iterative two-step channel pruning scheme first selects pruned channels with Lasso regression given a target pruning ratio, and then fine tunes weights. In a learned pruning ratio system, a pruning ratio may be jointly optimized across all the layers. According to aspects of the present disclosure, a redundancy of a channel may be associated with a variational information bottleneck (VIB). Gates may be added to the neural network, and a suitable regularization term may be added for training the sparsity.

Aspects of the present disclosure are directed to compressing a neural network, such as a deep neural network. In one configuration, a quantizer is specified to quantize weight parameters and activation values of the deep neural network. In one aspect, the quantizer uses a learnable mask to control a number of bits. In another aspect, the quantizer is a differentiable quantizer with a learnable quantization bit-width. Additionally, a deep neural network pruning scheme with a learnable pruning ratio prunes neurons and channels of the deep neural network. The quantization and pruning may be jointly learned and performed for the deep neural network. In one configuration, the quantization and pruning are jointly performed for each layer of the deep neural network.

A novel end-to-end joint training scheme may learn the optimal trade-off between a quantizing bit-width and a pruning ratio of the deep neural network. It is desirable to compress the deep neural network (e.g., the model) to satisfy a predefined memory and computation budget (e.g., memory constraint, a multiply-accumulate computation (MAC) constraint, or a BOP constraint) while maintaining a desired model performance. The memory constraint may be based on a size of a local memory (e.g., random access memory (RAM)) of a device executing the deep neural network and/or other memory used by the deep neural network, such as off-chip memory. The memory and computation budget may also be referred to as a device constraint or operational budget. The performance may be determined in terms of accuracy of the model.

As described, weights and activations may be quantized based on straight-through estimation. In this configuration, weights and activations of a trained neural network may have bell-shaped distributions with long tails. Consequently, uniform quantization may be sub-optimal for such distributions. In one configuration, a non-linear function maps a weight input x to $\tilde{x}$. In this configuration, $q_s$ is a minimum value to map and $q_m$ is a maximum value to map, where $0<q_s<q_m$, and $t>0$ is a mapping exponent controlling a shape of the mapping. The parameters $q_m$ and t are learnable parameters, and $q_s$ is a fixed value. The non-linear mapping is defined as:

$$\tilde{x} = \text{sign}(x) \cdot \begin{cases} 0, & |x| < q_s \\ (|x| - q_s)^t, & q_s \le |x| \le q_m \\ (q_m - q_s)^t, & |x| < q_m \end{cases}. \tag{1}$$

A non-linear mapping may not be used for activation quantization. Rather, for activation quantization, for any input x, $\tilde{x}$ may be derived from equation 1 with t fixed to one. After mapping, a uniform quantization is applied to x. In equation 2, d is a quantization step-size, and $x_q$ is the quantized value of x. The quantized version is given by:

$$x_q = \text{sign}(x) \cdot \begin{cases} 0, & |x| < q_s \\ d\left\lfloor \frac{(|x| - q_s)^t}{d} \right\rceil, & q_s \le |x| \le q_m \\ d\left\lfloor \frac{(q_m - q_s)^t}{d} \right\rceil, & |x| < q_m \end{cases}. \tag{2}$$

In equation 2, ⌊ ⌉ is a rounding operation. The quantization grid for weights is symmetric and the bit-width b is given by:

$$g = \log_2\left\lceil \frac{(q_m - q_s)^t}{d} + 1 \right\rceil + 1. \tag{3}$$

For rectifier linear unit (ReLU) activations, a symmetric unsigned grid may be used because resulting values are non-negative. Here, the activation bit-width b is given by:

$$b = \log_2\log_2\left\lceil \frac{(q_m - q_s)^t}{d} \right\rceil \tag{4}$$

In one configuration, a straight through estimation (STE) method is specified for back-propagating gradients through the quantizers. The gradients of the quantizer output with respect to d, $q_m$, and t are given by:

$$\nabla_d x_q = \begin{cases} \text{sign}(x)\left(\left\lfloor \frac{(|x| - q_s)^t}{d} \right\rceil - \left\lfloor \frac{(|x| - q_s)^t}{d} \right\rceil\right), & q_s \le |x| \le q_m \\ \text{sign}(x)\left(\left\lfloor \frac{(q_m - q_s)^t}{d} \right\rceil - \left\lfloor \frac{(q_m - q_s)^t}{d} \right\rceil\right), & |x| > q_m \\ 0 & \text{otherwise} \end{cases} \tag{5}$$

$$\nabla_{q_m} x_q = \begin{cases} 0, & |x| \le q_m \\ \text{sign}(x)t(q_m - q_s)^{t-1} & \text{otherwise} \end{cases} \tag{6}$$

$$\nabla_d x_q = \begin{cases} \text{sign}(x)((|x| - q_s)^c \log(|x| - q_s)), & q_s \le |x| \le q_m \\ \text{sign}(x)((q_m - q_s)^c \log(q_m - q_s)), & |x| > q_m \\ 0 & \text{otherwise} \end{cases}. \tag{7}$$

As described above, in one configuration, the structured pruning scheme is based on the variational information bottleneck (VIB) approach. In this configuration, multiplicative Gaussian gates are added to all channels in a layer. For each layer, the pruning scheme learns a variational posterior of a weight distribution to minimize mutual information between outputs of a current layer and outputs of a subsequent layer, while maximizing the mutual information between outputs of the current layer and final outputs of the artificial neural network. That is, the pruning scheme may prune channels based on the learned distributions. In equation 8, L represents a number of layers of an artificial neural network (e.g., deep neural network), $c_l$ is a number of output channels in the l-th layer, where l=1, . . . , L. Additionally, $h_l \in \mathcal{R}^{c_l}$ is the output of the l-th layer after activation, $y \in Y^{c_l}$ is the target output or data labels, and l(x;y) denotes the mutual information between a weight input x and a target output y. The variational information bottleneck loss function $\mathcal{L}_{VIB}$ is defined as:

$$\mathcal{L}_{VIB}=\gamma\Sigma_{l=1}^{L}I(h_l;h_{l-1})-I(h_l;y), \quad (8)$$

where γ is a scaling factor that is greater than zero. Additionally, it follows that the output of the l-th layer after activation is defined as:

$$h_l=z_l \odot f_l(h_{l-1}), \quad (9)$$

where $z_l=\{z_{l,1}, \ldots, z_{l,c_l}\}$ is a vector of gates for the l-th layer. The symbol ⊙ represents an element-wise multiplication operator, and $f_l$ represents a mapping function of the l-th layer, such as a concatenation of a linear transformation or a convolutional transformation, batch normalization, and/or another type of non-linear activation. That is, in equation 9, the sampled gate $z_l$ is applied to the channel output of the previous layer $h_{l-1}$. It is assumed the sampled gate $z_l$ follows a Gaussian distribution with a mean $\mu_l$ and a variance $\sigma_l^2$, which can be re-parameterized as:

$$z_l=\mu_l+\epsilon_l \odot \sigma_l, \quad (10)$$

where $\epsilon_l \sim \mathcal{N}(0,I)$. The prior distribution of $h_l$ conditioned on $h_{l-1}$ is:

$$p(h_l|h_{l-1}) \sim \mathcal{N}(\mu_l \odot f_l(h_{l-1}),\text{diag}[\sigma_l^2 \odot f_l(h_{l-1})^2]). \quad (11)$$

Aspects of the present disclosure assume a prior distribution of $h_l$ is also Gaussian:

$$q(h_l) \sim \mathcal{N}(0,\text{diag}[\xi_l]), \quad (12)$$

wherein $\xi_l$ is a vector of variances selected to minimize an upper bound of equation 8, as given:

$$\tilde{L}_{VIB} \triangleq CE(y, h_L) + \gamma \sum_{l=1}^{L} \sum_{i=1}^{c_l} \log\left(1 + \frac{\mu_{l,i}^2}{\sigma_{l,i}^2}\right). \quad (13)$$

In equation 13, $CE(y,h_L)$ is the cross-entropy loss between the target training labels y and the predicted labels from the l-th layer output $h_L$. The cross-entropy loss may determine an accuracy of the classification. The optimal vector of variances $\xi_l$ may be derived as:

$$\xi_l^*=(\mu_l^2+\sigma_l^2)E_{h_{l-1} \sim p(h_{l-1})}[f_l(h_{l-1})^2]. \quad (14)$$

That is, in equation 14, the optimal posterior distribution of the current layer $\xi_l^*$ may be explicitly computed based on a prior distribution of current layer $(\mu_l^2+\sigma_l^2)$ and the previous layer output $h_{l-1}$. A condition for pruning a channel may be based on a comparison of a pruning ratio $\alpha_l$ to a pruning threshold $\alpha_{th}$. The parameter $\alpha_l$ may be defined as $\alpha_l=\mu_l^2/\sigma_l^2$. If $\alpha_{l,i}<\alpha_{th}$, the i-th channel in the l-th layer may be pruned. The pruning parameters $\{\mu_l, \sigma_l\}$ may be learned during training to minimize a loss function.

Figure 4:
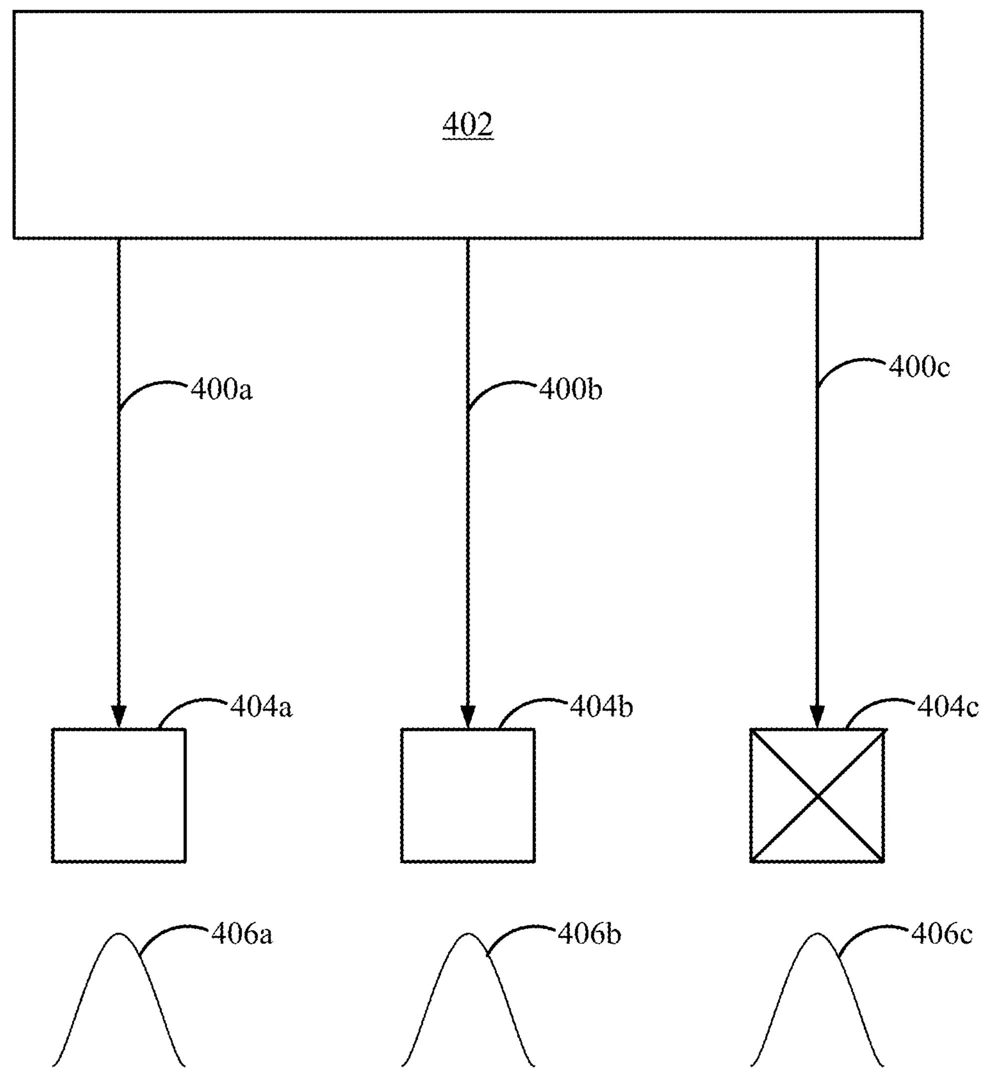
FIG. 4 is a diagram illustrating an example of pruning channels, in accordance with aspects of the present disclosure.

FIG. 4 is a diagram illustrating an example of pruning channels, in accordance with aspects of the present disclosure. In the example of FIG. 4, three output channels 400*a*, 400*b*, 400*c* are output from a layer 402 (e.g., convolutional layer) of an artificial neural network. An output of each channel 400*a*, 400*b*, 400*c* may be output by a gate 404*a*, 404*b*, 404*c*. Each gate 404*a*, 404*b*, 404*c* follows a Gaussian distribution $z_l \sim \mathcal{N}(\mu_l,\sigma_l^2)$ 406*a*, 406*b*, 406*c*. In one configuration, each gate 404*a*, 404*b*, 404*c* is specified for pruning. The pruning process learns the Gaussian distribution of an output of each gate 404*a*, 404*b*, 404*c* to determine whether a corresponding channel 400*a*, 400*b*, 400*c* should be pruned. That is, the Gaussian distribution 406*a*, 406*b*, 406*c*, including the mean $\mu_l$ and variance $\sigma_l$, of each gate 404*a*, 404*b*, 404*c* may be learned during training based on the loss function of equation 13. As described above, the loss function of equation 13 maximizes mutual information of an input and an output $h_L$. A pruning ratio $\alpha_{l,i}=\mu_{l,i}^2/\sigma_{l,i}^2$ of each channel 400*a*, 400*b*, 400*c* may be determined after determining the mean $\mu_{l,i}$ and variance $\sigma_{l,i}$ of a corresponding gate 404*a*, 404*b*, 404*c*. A channel 400*a*, 400*b*, 400*c* may be pruned if the pruning ratio $\alpha_{l,i}$ is less than a pruning threshold $\alpha_{th}$.

As an example, in FIG. 4, a pruning ratio $\alpha_{l,3}$ for the third channel 400*c* of layer l may be determined based on the learned mean $\mu_{l,3}$ and variance $\sigma_{l,3}$ of the third gate 404*c* of the layer l. That is, the pruning ratio $\alpha_{l,3}$ for the third channel 400*c* is equal to $\mu_{l,3}^2/\sigma_{l,3}^2$. In this example, the pruning ratio $\alpha_{l,3}$ for the third channel 400*c* is less than the tuning threshold $\alpha_{th}$, therefore, the third channel 400*c* is pruned (as indicated by the "X" in FIG. 4).

Aspects of the present disclosure may be implemented on various target-devices, such as graphical processing units (GPUs), tensor processing units (TPUs), several phone-chips, Internet of Things (IoT) devices, field programmable gate arrays (FPGAs), and dedicated silicon. Each device may correspond to a unique set of parameters. Additionally, efficiency of an artificial neural network may depend on specific kernel-implementations. Some devices do not have multiple bit-width kernels implemented. Therefore, a general metric may be specified to measure compression performance. In one configuration, a bit-operations (BOPs) count is specified to measure compression performance. Aspects of the present disclosure are not limited to the BOPs count and may be modified to optimize for specific hardware.

During training, the artificial neural network may determine a layerwise pruning ratio and MAC count. In one configuration, $p_l$ is a pruning ratio of the l-th layer output channels. $P_l$ is a layerwise pruning ratio, which is the ratio of the number of weights between the uncompressed and compressed models. The layerwise pruning ratio may be derived as:

$$P_l=1-(1-p_{l-1})(1-p_l). \quad (15)$$

The l-th layer multiply and accumulate (MAC) operations may be based on the l-th layer feature map and pruning ratio $p_l$. The output feature map of the l-th layer may have a width $m_{w,l}$, height $m_{h,l}$, a number of channels $c_l$. The parameter $k_w$ is a kernel width and $k_h$ is a kernel height. The MAC count may be computed as:

$$\text{MACs}_l \triangleq (1-p_{l-1})c_{l-1}\cdot(1-p_l)c_l\cdot m_{w,l}\cdot m_{h,l}\cdot k_w\cdot k_h \quad (16)$$

The BOP count in the l-th layer $\text{BOPs}_l$ may be defined as:

$$\text{BOPs}_l \triangleq \text{MACs}_l\cdot b_{w,l}\cdot b_{a,l-1}, \quad (17)$$

where $b_{w,l}$ is the l-th layer weight bit-width and $b_{a,l}$ is the l-th layer activation bit-width, where $b_{a,0}$ is a bit-width of an input to the artificial neural network.

The BOP compression ratio may be a ratio between the total BOPs of an uncompressed model and a compressed model. A MAC compression ratio may be a ratio between the total MACs of an uncompressed model and a compressed model. Without loss of generality, the MAC compression ratio measures the pruning effect, and the BOP compression ratio measures the overall effect from pruning and quantization. As shown in equation 17, the BOP count is a function of both a channel pruning ratio $p_l$, the l-th layer weight bit-width $b_{w,l}$, and the l-th layer activation bit-width $b_{a,l}$. The BOP compression ratio may be used to measure an overall compression of an artificial neural network (e.g., deep neural network).

In one configuration, the BOP count is incorporated in the loss function for joint optimization of pruning and quantization parameters. In one configuration, the loss function is defined as:

$$\mathcal{L}_{DJPQ} \triangleq \tilde{\mathcal{L}}_{VIB} + \beta\Sigma_{l=1}^{L}\text{BOPs}_l, \tag{18}$$

where $\tilde{\mathcal{L}}_{VIB}$ is the upper bound to the variational information bottleneck loss function of equation 13, β is a scalar, and $\text{BOPs}_l$ is defined in equation 17. In equation 18, $\text{BOPs}_¿$ is used as regularization term. In one configuration, $\text{BOPs}_l$ may be replaced by another resource constraint, such as memory cost. The loss function $\mathcal{L}_{DJPQ}$ jointly optimizes task accuracy and computation cost affected by pruning and quantization. More specifically, the parameter $\tilde{\mathcal{L}}_{VIB}$ measures classification accuracy and pruning effect, while the parameter $\text{BOPs}_l$ reflects the computation cost affected by both pruning and quantization. For hard pruning, the channel pruning ratio $p_l$ may be defined as:

$$p_l = \frac{\sum_{i=1}^{c_l} 1\{\alpha_{l,i} < \alpha_{th}\}}{c_l}, \tag{19}$$

where 1 { } is an indicator function. The channel pruning ratio $p_l$ in equation 19 is determined after training. During training, the artificial neural network may learn to prune channels by training the distribution of $\alpha_{l,i}$. The loss function is a function of $\alpha_{l,i}$. However, $\alpha_{l,i}$ in equation 19 is not differentiable and cannot be learned with gradient backpropagation. To make the loss function differentiable with regard to $\alpha_{l,i}$, the indication function of equation 19 may be relaxed with a sigmoid function. For soft pruning during training, the indicator function of equation 19 may be relaxed by a sigmoid function σ( ) as follows:

$$p_l = \frac{\sum_{i=1}^{c_l} \sigma\left\{\frac{\alpha_{l,i} - \alpha_{th}}{T}\right\}}{c_l}, \tag{20}$$

where T is a temperature parameter. Based on the soft pruning, the channel pruning ratio $p_l$ may be differentiable with respect to $\mu_l$ and $\sigma_l$. Thus, $\text{BOPs}_l$ may also be differentiable based on the soft pruning. The parameters of the joint optimization of pruning and quantization include $w_l$, $(\mu_l, \sigma_l)$, and $(q_{m,wl}, d_{w,l}, t_{w,l}, q_{m,al}, d_{a,l})$ for l=1, . . . , L.

TABLE 1 is an example of a process for differentiable joint pruning and quantization according to aspects of the present disclosure. As shown in TABLE 1, a neural network with weights $w_l$ may be input to a differentiable joint pruning and quantization function. The parameter l is an l-th layer and L represents a number of layers of an artificial neural network (e.g., deep neural network), where l=1, . . . , L (e.g., ∈[1,L]). Training data may also be input to the differentiable joint pruning and quantization function. The training data may include a classification input, such as a set of images, and corresponding class labels.

In one configuration, for each layer l, the differentiable joint pruning and quantization function samples a vector of gates $z_l$ for the l-th layer. It is assumed $z_l$ follows a Gaussian distribution $\mathcal{N}$( ) with mean $\mu_l$ and variance $\sigma_l^2$ (e.g., $\mathcal{N}(\mu_l, \sigma_l^2)$). The vector of gates may be multiplied to a channel output of a previous layer (e.g., $h_l = z_l \odot f_l(h_{l-1})$, see equation 9). The process then determines a channel pruning ratio $p_l$ based on equation 19. A layerwise pruning ratio $P_l$ may then be determined according to equation 15. In addition to determining the layerwise pruning ratio $P_l$, the process determines a bit-width $b_{w,l}$ and $b_{a,l}$ according to equations 3 and 4, where $b_{w,l}$ is the l-th layer weight bit-width and $b_{a,l}$ is the l-th layer activation bit-width. In one configuration, the bit-width is restricted to a power-of-two (see TABLE 2). After determining the bit-width $b_{w,l}$ and $b_{a,l}$, the process quantizes the weights $w_l$ and outputs $h_l$ of the l-th layer.

During a backward pass, the process determines the gradients of the maximum weight value $q_{m,wl}$ and the maximum activation value $q_{m,al}$ (e.g., $\nabla_{q_m} x_q$, see equation 6), the gradients of weight step size $d_{w,l}$ and the activation step size $d_{a,l}$ (e.g., $\nabla_d x_q$, see equation 5), and the gradient of a mapping exponent $t_{w,l}$ (e.g., $\nabla_t x_q$, see equation 7). The process also determines the gradients for the mean $\mu_l$, the variance $\sigma_l$, and the weights $w_l$. Finally, the mean $\mu_l$, the variance $\sigma_l$, the weights $w_l$, the maximum weight value $q_{m,wl}$, the maximum activation value $q_{m,al}$, the weight step size $d_{w,l}$, the activation step size $d_{a,l}$, and the mapping exponent $t_{w,l}$ are updated based on the learning rates.

TABLE 1

```
Input: A neural network with weight w_l, l ∈ [1, L]; training data
Output: b_w,l, b_a,l, P_l, l ∈ [1, L]
Parameters: w_l, (μ_l, σ_l), (q_m,wl, d_w,l, t_w,l, q_m,al, d_a,l), l ∈ [1, L]
Forward pass:
Anneal strength γ and β after each epoch
for l ∈ {1, . . . , L} do
  Draw samples z_l ~ N(μ_l, σ_l^2) and multiply to the channel output
  Compute p_l according to equation 19
  Compute the layerwise pruning ratio P_l according to equation 15
  Compute bit-width b_w,l and b_a,l according to equations 3 and 4
  if bit-restricted then
    Adjust b_w,l, d_w,l, b_a,l and d_a,l according to TABLE 3
  Quantize w_l and h_l
Compute L_DJPQ according to equation 20
Backward pass:
for l ∈ {1, . . . , L} do
  Compute the gradients of (d_w,l, d_a,l), (q_m,wl, q_m,al), and t_w,l, according
  to equations 5, 6, and 7, respectively
  Compute the gradients of μ_l and σ_l
  Compute the gradients of w_l
  Update w_l, (μ_l, σ_l), (q_m,wl, d_w,l, t_w,l, q_m,al, d_a,l) with the corresponding
  learning rate
```

In one configuration, the quantization bit-width b may be restricted to power-of-two values (e.g., b∈{2, 4, 8, 16, 32}) to align aspects of the present disclosure with conventional hardware features. The bit-width b may be restricted to a power-of-two value based on a hardware configuration. In this configuration, bit-width may be rounded to the nearest power-of-two representable value. TABLE 2 is an example of adjusting a quantization step size $d_l$ and bit-width $b_l$ for each layer during training, for the bit-width b to satisfy the power-of-two constraint. In TABLE 2, the parameter $s_l$ represents a log value.

TABLE 2

| |
|---|
| Input: step-size $d_l$, max. range $q_{m,l}$, exponent $t_l$ |
| Output: Adjusted bit-width $b_l'$ and step-size $d_l'$ |
| Compute $b_l$ according to equations 3 or 4 |
| Compute $s_l$: $s_l = \log_2 b_l$ |
| Adjust $s_l$ to $s_l'$: $s_l' = \lfloor s_l \rceil$ |
| Adjust $b_l$ to $b_l'$ with $s_l'$ $b_l' = 2^{s_l'}$ |
| Adjust $d_l$ to $d_l'$ with $b_l'$: $d_l' = \frac{(q_m - q_s)^t}{2^{b'-1} - 1}$ or $d_l' = \frac{(q_m - q_s)^t}{2^{b'}}$ |

As described above, the quantization grid is learned via a straight through estimator. In another configuration, the quantization grid is learned by binary bit masks relaxed based on a concrete distribution. A structured learnable mask vector m is specified for the quantizer of each layer. The structured learnable mask m may be a vector of mask elements $m_i$, where $m_i=(m_1, \ldots, m_K)$ and K is a maximum bit-width. The structured learnable mask m may control the bit-width of quantized weight in the artificial neural network (e.g., deep neural network). Each mask element $m_i$ is a Bernoulli random variable having a value of either zero or one, where a mask element $m_i$ is activated when the Bernoulli random variable is one. Additionally, each mask element $m_i$ has a turn on probability of $p_i$ that may be learned by gradient descent. Additionally, each mask element $m_i$ affects a different number of quantization levels. Each quantization level is activated only when all of the mask elements $m_i$ associated with that level are set to one.

Figure 5:
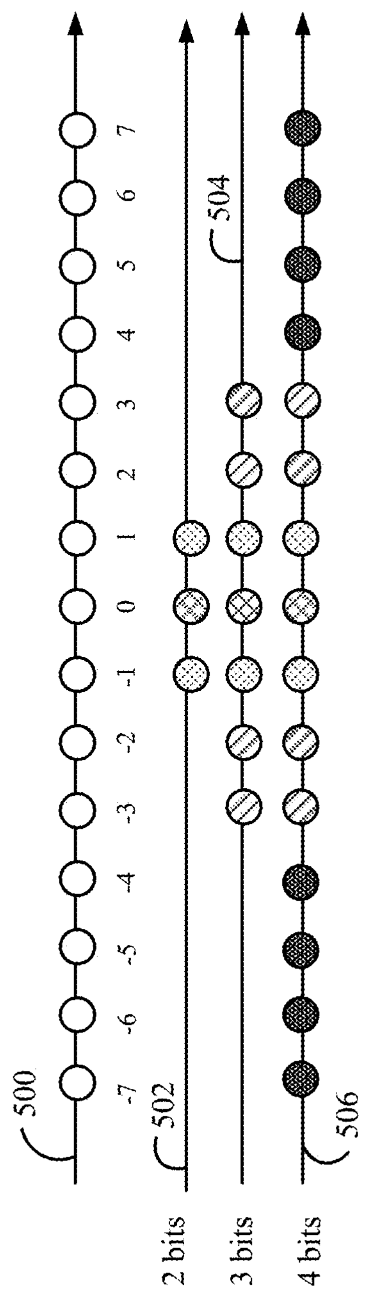
FIG. 5 is a diagram illustrating an example of mask quantization, in accordance with aspects of the present disclosure.

FIG. 5 is a diagram illustrating an example of mask quantization, in accordance with aspects of the present disclosure. In the example of FIG. 5, a base grid G 500 represents a number of bits, where zero represents a sign, and a maximum bit-width is four (e.g., K=4). As shown in FIG. 5, each mask element $m_i$ represents a different quantization level. The quantized bit-width may represent a range of integer values corresponding to the quantization level. For illustrative purposes, in FIG. 5, the range of integer values corresponding to the quantization level are shown as dots.

For example, a first mask element $m_1$ represents a first quantization level 502. That is, when the mask m is 100 (e.g., ($m_1$, $m_2$, $m_3$=100)), $m_1$ is activated and a first quantization level 502 is two bits representing integer values (−1, 0, 1), where a first bit represents the sign and a second bit represents a value for zero or one. As another example, when the mask m is 110 (e.g., ($m_1$, $m_2$, $m_3$=110)), $m_1$ and $m_2$ are activated and a second quantization level 504 is three bits representing integer values (−3,−2,−1, 0, 1, 2, 3), where one of the three bits represents the sign and the remaining bits represent a value from zero to three. In yet another example, when the mask m is 111 (e.g., ($m_1$, $m_2$, $m_3$=111)), $m_1$, $m_2$, and $m_3$ are activated, and a third quantization level 506 is four bits representing integer values (−7,−6,−5,−4,−3,−2,−1, 0, 1, 2, 3, 4, 5, 6, 7), where one of the four bits represents the sign, and the remaining bits represent a value from zero to seven.

In this configuration, the bit width is decided by the mask vector m, $$b=\Sigma_{i=1}^{K} m_i+1, \tag{21}$$

where a step size d is decided by the maximum range $q_m$ and bit width b. That is, $$d = \frac{q_m}{2^{b-1}}, \tag{22}$$

where the maximum range $q_m$ is derived as the maximum value of all the parameters from the pre-trained model. The quantized value of input x can be expressed as:

$$x_q = \text{sign}(x)\begin{cases} d\left\lfloor \frac{|x|}{d} + \frac{1}{2} \right\rfloor, & |x| \le q_m \\ q_m, & |x| > q_m \end{cases}, \tag{23}$$

where d is a trainable step size, x is the weight to be quantized (e.g., a floating point weight), and $x_q$ is the corresponding quantized value. In equation 23, $x_q$ is a discrete function of the learned masks m. In equation 23, a mask element $m_i$ is discrete. That is, the mask element $m_i$ is either one or zero. Therefore, a mask element $m_i$ may be referred to as a binary mask. In one configuration, a concrete relaxation of the binary mask $m_i$ may be specified for gradient based optimization:

$$m_i = \frac{1}{1 + \exp(-(\log \tau_i + r)/\lambda)}, \; r = \frac{u}{1-u}, \tag{24}$$

where $\tau_i$ is a trainable probability parameter corresponding to the probability p of the mask element $m_i$, u is a uniform random variable between zero and one, and λ is a fixed value (e.g., temperature). In equation 24, the mask element $m_i$ is either zero or one, the probability of the mask element $m_i$ being one is $$\frac{\tau_i}{1+\tau_i},$$

that is $$p(m_i = 1) \approx \frac{\tau_i}{1+\tau_i}.$$

In one configuration, gradient descent is performed to learn $\log \tau_i$ from the concrete relaxation of the binary mask $m_i$. In this configuration, the quantization scheme learns to set masks elements $m_i$ to one by learning $\log \tau_i$.

Table 3 is an example of a process (e.g., training process) for optimizing a bit-width based on a learnable mask, in accordance with aspects of the present disclosure.

TABLE 3

| |
|---|
| Input: A neural network with weight $w_l$, $l \in [1, L]$; training data |
| Output: $b_{w,l}$, $b_{a,l}$, $P_l$, $l \in [1, L]$ |
| Parameters: $w_l$, $(\mu_l, \sigma_l)$, $(d_{w,l}, \tau_{w,l}, d_{a,l}, \tau_{a,l})$, $l \in [1, L]$ |
| Forward pass: |
| Anneal strength γ and β after each epoch |
| for $l \in \{1, \ldots, L\}$ do |
| Draw samples $z_l \sim \mathcal{N}(\mu_l, \sigma_l^2)$ and multiply to the channel output |
| Compute $p_l$ according to equation 19 |

TABLE 3-continued

| |
|---|
| Compute the layerwise pruning ratio $P_l$ according to equation 17 |
| Draw samples $m_{l,i}$ from Concrete distribution according to equation 2 for $i \in [1, K]$ |
| Compute bit-width $b_{w,l}$ and $b_{a,l}$ according to equation 22 |
| Compute the step size $d_{w,l}$ and $d_{a,l}$ according to equation 21 |
| Quantize $w_l$ and $h_l$ according to equation 23 |
| Compute $\mathcal{L}_{DJPQ}$ according to equation 18 |
| Backward pass: |
| for $l \in \{1, \ldots, L\}$ do |
| Compute the gradients of $(d_{w,l}, d_{a,l})$, and $\tau_{w,l}, \tau_{a,l}$, respectively |
| Compute the gradients of $\mu_l$ and $\sigma_l$ |
| Compute the gradients of $w_l$ |
| Update $w_l$, $(\mu_l, \sigma_l)$, $(d_{w,l}, d_{a,l}$, and $\tau_{w,l}, \tau_{a,l})$ with the corresponding learning rate |

As shown in TABLE 3, a process may initialize a probability parameter $\alpha_l$, and weights W. For example, the probability parameter $\alpha_l$ is initialized to a large value. The value may correspond to $p(m_i=1)=0.9$. Intuitively, upon initialization all masks may be turned on, thus, an initial bit width may be large. During training the bit width is reduced by gradually turning off a few masks. The bit width may be determined based on a mask vector m, $b=\Sigma_{i=1, \ldots, k} m_i$. The initial value of the step size d may be determined based on the maximum range $q_m$ and bit width b. That is, $$d = \frac{q_m}{2^{(b-1)}}.$$

The maximum range $q_m$, may be determined based on a maximum value of weight parameters in a layer. The weight parameters may be from a pre-trained model and the weights. The weights W may be initialized from a pre-trained model. As described, the probability parameter $\alpha_{l,i}$ (e.g., $\log \alpha_{l,i}$) is associated to a probability of a value of a mask element $m_{l,i}$ being equal to one (e.g., $p(m_{l,i}=1)$). The parameter $d_l$ is a step size for determining the range of the quantization grid $G_l$, such as the grid $G_l$ 500 described with reference to FIG. 5.

During a forward pass, the mask $m_{l,i}$ for each layer is sampled from a concrete distribution in equation 24. More specifically, a uniform random variable u~Unif(0,1) is sampled, where Unif(0,1) represent a uniform distribution between 0 and 1. The mask m, may be determined based on equation 24. After training, the mask $m_{l,i}$ may be set to 1 if $$u < \frac{\tau_{l,i}}{1 + \tau_{l,i}}$$

and 0 otherwise. The process then updates the quantization grid based on the sampled mask elements $m_l$, and quantizes weights and activations of a current layer. That is, the quantizer may apply the mask elements $m_l$ to the quantization grid of each layer. The quantizer may also apply the scaling factor to the quantization grid of each layer.

Finally, after quantizing weights and activations for each layer, the process computes the current loss based on a loss function $\mathcal{L}_{DJPQ}$ defined equation 18. Aspects of the present disclosure are directed to minimizing the loss function $\mathcal{L}_{DJPQ}$.

Additionally, as shown in TABLE 3, during a backward pass, the process determines a gradient of the loss $\mathcal{L}_{DJPQ}$ with respect to the step size $$d_l\left(\frac{\partial L}{\partial d_l}\right)$$

and a gradient of the loss with respect to the mask parameter $$\tau_{l,i}\left(\frac{\partial L}{\partial \tau_{l,i}}\right)$$

with stochastic gradient descent. The gradients may adjust the parameters, such as the step size, mask parameter, and the pruning gate parameters.

As described above, emerging technologies, such as IoT services, implement deep neural networks on edge devices, such as mobile devices. Edge devices may have limited storage, memory, and/or processing capabilities. Therefore, it may be desirable to reduce a model size and reduce computational use. The reduced model size and reduced computational use may also improve federated learning systems.

Conventional federated learning systems focus on full-precision models. These full-precision models may be large and difficult to implement on federated learning systems due to limited computation and communication resources. Aspects of the present disclosure may improve federated learning systems by compressing a model during training, thereby reducing computation and/or communication costs. In one configuration, each device of a federated learning system uses local or partial data to train the model with a local stochastic gradient descent (SGD) method. The loss function may be the average of the loss functions for all devices of the federated learning system. The parameters for pruning and quantization may be trained through the local SGD method. Additionally, the pruning and quantization of the model may improve privacy protection in federated learning systems.

Figure 6:
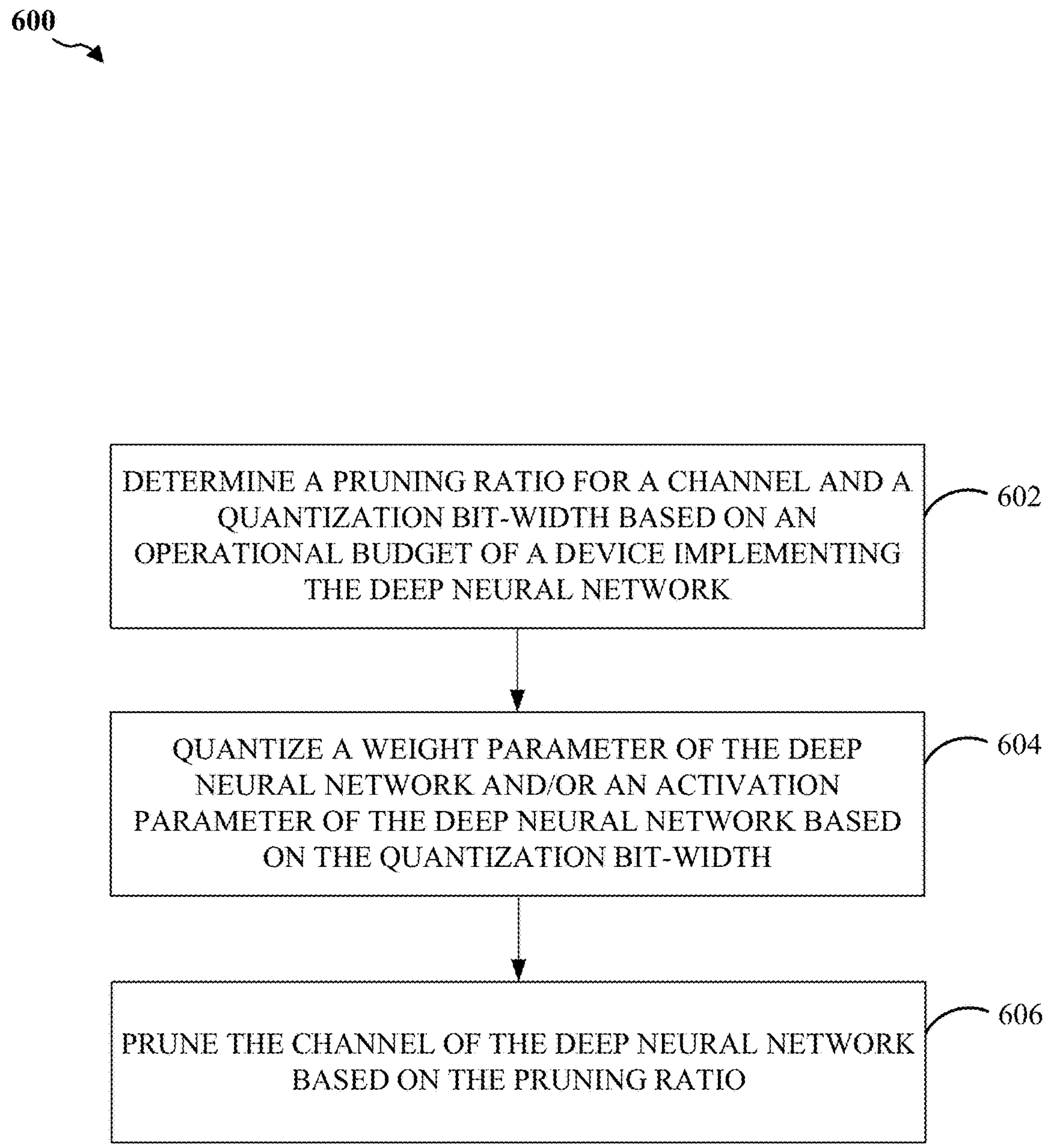
FIG. 6 illustrates a flow diagram for a method for compressing a deep neural network in accordance with aspects of the present disclosure.

FIG. 6 illustrates a flow diagram for a process 600 for compressing a deep neural network according to an aspect of the present disclosure.

In block 602, the deep neural network may determine a pruning ratio for a channel and a quantization bit-width based on an operational budget of a device implementing the deep neural network. The quantization bit-width may be a mixed-precision quantization bit-width. In one configuration, the pruning ratio is determined based on a mean and variance of a Gaussian distribution of an output of a gate corresponding to the channel, such as a gate 404*a*, 404*b*, 404*c* as described with respect to FIG. 4. The channel may be pruned based on the pruning ratio being less than a pruning threshold.

In block 604, the deep neural network may quantize a weight parameter of the deep neural network and/or an activation parameter of the deep neural network based on the quantization bit-width. During training, the deep neural network back-propagates gradients of a maximum bit-width value, a step size, and a mapping exponent to determine the quantization bit-width. The quantization bit-width may include a weight bit-width and/or an activation bit-width. In one configuration, the quantization bit-width is restricted to a power-of-two value. In another configuration, the quantization bit-width is determined based on a bit mask, each bit of the bit mask may be enabled or disabled based on a concrete distribution.

Additionally, in block 606, the UE may prune the channel of the deep neural network based on the pruning ratio. In one configuration, the deep neural network jointly learns the pruning ratio and the quantization bit-width as a function of the operational budget (e.g., a memory or bit operations (BOPs) count), a weight bit-width, an activation bit-width, and a channel pruning ratio The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein and in Appendices A and B. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described herein and in Appendices A and B. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method for compressing a deep neural network, comprising:

jointly learning, during a training stage of the deep neural network, a first pruning ratio for a channel of a layer and a quantization bit-width to be used by a jointly differentiable pruning and quantization function based on an operational budget of a hardware device implementing the deep neural network, the operational budget being based on one or more of an amount of local memory of the hardware device, an amount of memory used by the deep neural network, or a bit-operation (BOP) count;

quantizing, via the jointly differentiable pruning and quantization function, at least one of a weight parameter of the deep neural network, an activation parameter of the deep neural network, or a combination thereof based on the quantization bit-width; and pruning, via the jointly differentiable pruning and quantization function, the channel of the deep neural network based on the first pruning ratio.

2. The processor-implemented method of claim 1, further comprising:

determining the first pruning ratio based on a mean and variance of a Gaussian distribution of an output of a gate associated with the channel; and pruning the channel in response to the first pruning ratio being less than a pruning threshold.

3. The processor-implemented method of claim 1, further comprising back-propagating gradients of a maximum bit-width value, a step size, and a mapping exponent to determine the quantization bit-width, in which the quantization bit-width comprises at least one of weight bit-width or an activation bit-width.

4. The processor-implemented method of claim 1, further comprising restricting the quantization bit-width to a power-of-two value.

5. The processor-implemented method of claim 1, further comprising determining the quantization bit-width based on a bit mask, each bit of the bit mask enabled or disabled based on a concrete distribution.

6. The processor-implemented method of claim 1, in which the first pruning ratio and the quantization bit-width are further jointly learned as a function of a weight bit-width, an activation bit-width, and a second pruning ratio.

7. The processor-implemented method of claim 1, in which the deep neural network is implemented on at least one device of a plurality of devices of a federated learning system.

8. An apparatus for compressing a deep neural network, comprising:

one or more processors;

one or more memories coupled with the one or more processors; and instructions stored in the one or more memories and operable, when executed by the one or more processors, to cause the apparatus:

to jointly learn, during a training stage of the deep neural network, a first pruning ratio for a channel of a layer and a quantization bit-width to be used by a jointly differentiable pruning and quantization function based on an operational budget of a hardware device implementing the deep neural network, the operational budget being based on one or more of an amount of local memory of the hardware device, an amount of memory used by the deep neural network, or a bit-operation (BOP) count;

to quantize, via the jointly differentiable pruning and quantization function, at least one of a weight parameter of the deep neural network, an activation parameter of the deep neural network, or a combination thereof based on the quantization bit-width; and to prune, via the jointly differentiable pruning and quantization function, the channel of the deep neural network based on the first pruning ratio.

9. The apparatus of claim 8, in which execution of the instructions further causes the apparatus:

to determine the first pruning ratio based on a mean and variance of a Gaussian distribution of an output of a gate associated with the channel; and to prune the channel in response to the first pruning ratio being less than a pruning threshold.

10. The apparatus of claim 8, in which execution of the instructions further causes the apparatus to back-propagate gradients of a maximum bit-width value, a step size, and a mapping exponent to determine the quantization bit-width, in which the quantization bit-width comprises at least one of weight bit-width or an activation bit-width.

11. The apparatus of claim 8, in which execution of the instructions further causes the apparatus to restrict the quantization bit-width to a power-of-two value.

12. The apparatus of claim 8, in which execution of the instructions further causes the apparatus to determine the quantization bit-width based on a bit mask, each bit of the bit mask enabled or disabled based on a concrete distribution.

13. The apparatus of claim 8, in which execution of the instructions further causes the apparatus to jointly learn the first pruning ratio and the quantization bit-width as a function a weight bit-width, an activation bit-width, and a second pruning ratio.

14. The apparatus of claim 8, in which the apparatus is a component of one device of a plurality of devices of a federated learning system.

15. An apparatus, comprising:

means for jointly learning, during a training stage of the deep neural network, a first pruning ratio for a channel of a layer and a quantization bit-width to be used by a jointly differentiable pruning and quantization function based on an operational budget of a hardware device implementing the deep neural network, the operational budget being based on one or more of an amount of local memory of the hardware device, an amount of memory used by the deep neural network, or a bit-operation (BOP) count;

means for quantizing at least one of a weight parameter of the deep neural network, an activation parameter of the deep neural network, or a combination thereof based on the quantization bit-width; and means for pruning the channel of the deep neural network based on the first pruning ratio, the means for pruning and the means for quantizing being jointly differentiable.

16. The apparatus of claim 15, further comprising:

means for determining the first pruning ratio based on a mean and variance of a Gaussian distribution of an output of a gate associated with the channel; and means for pruning the channel in response to the first pruning ratio being less than a pruning threshold.

17. The apparatus of claim 15, further comprising means for back-propagating gradients of a maximum bit-width value, a step size, and a mapping exponent to determine the quantization bit-width, in which the quantization bit-width comprises at least one of a weight bit-width or an activation bit-width.

18. The apparatus of claim 15, further comprising means for restricting the quantization bit-width to a power-of-two value.

19. The apparatus of claim 15, further comprising means for determining the quantization bit-width based on a bit mask, each bit of the bit mask enabled or disabled based on a concrete distribution.

20. The apparatus of claim 15, in which the means for jointly learning the first pruning ratio and the quantization bit-width further comprises means for jointly learning the first pruning ratio and the quantization bit-width as a function of a weight bit-width, an activation bit-width, and a second pruning ratio.

21. A non-transitory computer-readable medium having program code for compressing a deep neural network recorded thereon, the program code for compressing the deep neural network executed by a deep neural network and comprising:

program code to jointly learn, during a training stage of the deep neural network, a first pruning ratio for a channel of a layer and a quantization bit-width to be used by a jointly differentiable pruning and quantization function based on an operational budget of a hardware device implementing the deep neural network, the operational budget being based on one or more of an amount of local memory of the hardware device, an amount of memory used by the deep neural network, or a bit-operation (BOP) count;

program code to quantize, via the jointly differentiable pruning and quantization function, at least one of a weight parameter of the deep neural network, an activation parameter of the deep neural network, or a combination thereof based on the quantization bit-width; and program code to prune, via the jointly differentiable pruning and quantization function, the channel of the deep neural network based on the first pruning ratio.

22. The non-transitory computer-readable medium of claim 21, in which the program code for compressing the deep neural network further comprises:

program code to determine the first pruning ratio based on a mean and variance of a Gaussian distribution of an output of a gate associated with the channel; and program code to prune the channel in response to the first pruning ratio being less than a pruning threshold.

23. The non-transitory computer-readable medium of claim 21, in which the program code for compressing the deep neural network further comprises program code to back-propagate gradients of a maximum bit-width value, a step size, and a mapping exponent to determine the quantization bit-width, in which the quantization bit-width comprises at least one of a weight bit-width or an activation bit-width.

24. The non-transitory computer-readable medium of claim 21 in which the program code for compressing the deep neural network further comprises program code to restrict the quantization bit-width to a power-of-two value.

25. The non-transitory computer-readable medium of claim 21, in which the program code for compressing the deep neural network further comprises program code to determine the quantization bit-width based on a bit mask, each bit of the bit mask enabled or disabled based on a concrete distribution.

26. The non-transitory computer-readable medium of claim 21, in which the program code to jointly learn further comprises program code to jointly learn the first pruning ratio and the quantization bit-width as a function of a weight bit-width, an activation bit-width, and a second pruning ratio.

* * * * *